United States Patent [19]

Budil

[11] Patent Number: 5,784,309
[45] Date of Patent: Jul. 21, 1998

[54] OPTICAL VECTOR MULTIPLIER FOR NEURAL NETWORKS

[76] Inventor: Matthias Budil, Kobenzlgasse 106, A-1190, Vienna, Austria

[21] Appl. No.: 702,599
[22] PCT Filed: Mar. 1, 1995
[86] PCT No.: PCT/AT95/00039
  § 371 Date: Sep. 25, 1996
  § 102(e) Date: Sep. 25, 1996
[87] PCT Pub. No.: WO95/24006
  PCT Pub. Date: Sep. 8, 1995

[30] Foreign Application Priority Data

Mar. 2, 1994 [AT] Austria ..................... 443/94
Feb. 17, 1995 [AT] Austria ..................... 296/95

[51] Int. Cl.$^6$ ........................................... G06G 7/16
[52] U.S. Cl. ........................................... 364/841
[58] Field of Search ........................... 364/713, 754, 364/807, 841, 845, 735

[56] References Cited

U.S. PATENT DOCUMENTS

| | | |
|---|---|---|
| 4,005,394 | 1/1977 | Kiemle . |
| 4,569,033 | 2/1986 | Collins et al. ............ 364/845 |
| 4,603,398 | 7/1986 | Bocker . |
| 4,607,344 | 8/1986 | Athale . |
| 4,620,293 | 10/1986 | Schlunt et al. . |
| 4,758,976 | 7/1988 | Cohen . |
| 4,800,519 | 1/1989 | Grinberg et al. ......... 364/845 |
| 4,862,406 | 8/1989 | Fisher . |
| 4,937,776 | 6/1990 | Myers . |

FOREIGN PATENT DOCUMENTS

| | | |
|---|---|---|
| 0 450 526 A2 | 10/1991 | European Pat. Off. . |
| 40 19 748 A1 | 1/1992 | Germany . |
| 2 267 165 | 11/1993 | United Kingdom . |
| WO 91/07714 | 5/1990 | WIPO . |

OTHER PUBLICATIONS

Athale et al., "Compact Archritectures for Adaptive Neural Nets", Optical Engineering, Apr. 1989, vol. 28 No. 4, pp. 447–455.
Yang et al, "Fully Parallel Optical Matrix–Matrix Multiplier Using Spherical Lens Array", OPTIK, vol. 91, No. 1, Jul. 1992, pp. 41–45.
Athale et al., "Optical Processing Using Outer–Product Concepts", Proc. of The IEEE, vol. 72, No. 7, Jul. 1984, pp. 931–941.

*Primary Examiner*—Tan V. Mai
*Attorney, Agent, or Firm*—Herbert Dubno

[57] ABSTRACT

An optical vector multiplier can perform linear algebra calculations by using electro-optical modulators of sandwich-type construction or in liquid crystal fields such as occur, inter alia, in the case of neural networks. It can calculate linear algebra operations as rapidly as possible, although the matrix is represented by slow liquid crystal fields. In addition, it can also use the transposed matrix, can calculate the vector product of two vectors and store the resultant matrix of the vector product directly in the region of the matrix modulator cells. To this end, two rapid electro-optical modulators of sandwich-type construction, representing a vector, are disposed offset by 90° and a matrix-shaped optical modulator that represents the matrix follows this arrangement. The vector modulator arrangement that is offset by 90° can form the vector product of two vectors, the result being determined by a detector matrix whose detectors are located on the matrix modulator of each modulator cell. Thus the information can be stored locally there and processed.

7 Claims, 5 Drawing Sheets

OPTICAL VECTOR MULTIPLIER FOR NEURAL NETWORKS

CROSS REFERENCE TO RELATED APPLICATION

This application is a national stage of PCT/AT 95/00039 filed 1 Mar. 1995 and based upon Austrian National applications A443/94 and A296/95 of 2 Mar. 1994 and 17 Feb. 1995, respectively, under the International Convention.

FIELD OF THE INVENTION

My present invention relates to an optical vector multiplier which can carry out calculations of linear algebra, whereby two light modulators with strip-shaped modulator cells representing a vector, are rotated 90° to one another and are arranged in a light path. The light modulators are preferably constructed as opto-electronic modulators in a sandwich structure. The optical vector multiplier can carry out the calculations of linear algebra, in which the light of a field of individually controllable light sources preferably laser diodes or light diodes, representing a vector is so divided by optical devices that a strip-shaped parallel intensity distribution results.

BACKGROUND OF THE INVENTION

Hitherto, optical computers have been known in which vector matrix multiplication and the cross product or vector products could be calculated and for which electro-optic modulators or light source fields were used. The English Patent GB-A-2 267 165 (SHARP) shows an optical processor which can carry out vector matrix multiplication and also form the cross product of two vectors with the aid of two light paths. The resultant matrix of the cross product can be stored in the region of the cells of the matrix modulator. This arrangement has not been however useful in the field of transposed matrices. The European open application EP A2-450 526 (HUGHES AIRCRAFT) shows an optical processor which can form the cross product of two vectors.

OBJECTS OF THE INVENTION

It is an object of this invention to provide an optical vector multiplier for a neural network whereby, operations of linear algebra can be calculated as fast as possible, while the matrix is represented by slow liquid crystal fields or by electro-optic modulators whose cells can only respond serially.

It is another object to provide a multiplier whereby even transposed matrices can be used in the vector matrix multiplication, the cross product of two vectors can be calculated and the resultant matrix of the cross product can be directly stored in the regions of the cells of the matrix modulator.

Still another object allows the light detectors to be distributed optionally and such that the vector multiplier can operate digitally.

Yet a further object is to provide for the possibility of representing matrices with negative elements.

Accomplishment of these objects will make the arrangement of the invention especially suitable for the various models of a neural network and for use also in a cascade configuration for multi-layer networks.

SUMMARY OF THE INVENTION

These objects are achieved in that an optical multiplier is followed in the light path by a matrix form or chessboard form light modulator, preferably a liquid crystal modulator, which represents a matrix, whereby selectively there are provided thereon light detectors and/or electronic circuitry which process the signals from the detectors and control the modulator cells, and reflecting and/or transmitting modulators are used. The overall modulator arrangement is transluminated with parallel light, and the light additionally with the aid of optical devices impinges on one or more light detector fields whereby the light beams are so deflected that resultant vectors of vector matrix multiplication and/or vector transposed matrix multiplications can be formed.

Aside from this, the objects are achieved in that a light modulator with strip-shaped modulator cells representing a vector is provided and this light modulator is configured preferably as an opto-electronic modulator in a sandwich construction. The light modulator is arranged in the light path rotated through 90° with respect to the strip-like intensity distribution, this arrangement is followed in the light path by a matrix form or chessboard form light modulator, preferably a liquid crystal modulator, representing a matrix, whereby selectively there are provided thereon light detectors and/or electronic circuitry which further processes the signals from the detectors and control the modulator cells, and reflecting and/or transmitting modulators are used. In this case the light then impinges with the aid of optical devices on one or more light detector fields whereby the light beams are so deflected that resultant vectors of vector matrix multiplications and/or vector- transposed matrix multiplications can be formed.

The objects can further be achieved in that this arrangement is followed in the light path by a matrix form or chessboard form light modulator, preferably a liquid crystal modulator, representing a matrix, whereby selectively thereon there are provided light detectors and/or electronic circuitry which process the signals from the detectors and control the modulator cells and reflecting and/or transmitting modulators are used. In this case the overall modulator arrangement is transluminated with diffuse light, with light from a light source matrix or with light passing through a binary-phase grid or another optical device with a matrix-shaped intensity distribution which, with the aid of lenses or other optical devices is projected upon the respective next modulator. The light can then impinge with the aid of optical devices upon one or more light detector fields, whereby the light beams are so deflected that resultant vectors of vector matrix multiplications and/or vector transposed matrix multiplications can be formed.

By the 90° rotated arrangement of the vector modulators, one achieves with one and the same construction both the use of a matrix and also of the transposed matrix. All that is necessary is that the respective other vector modulator be uniformly transluminated at all rows or columns. With the aid of the 90° rotated vector modulator arrangement, the cross product of two vectors can be formed whereby the resultant is detected by a detector matrix. This detector matrix can also be found on the chessboard-like optical modulator with each of the individual detector cells being located in the vicinity of a cell of the matrix modulator. As a result, the information can be locally stored and processed. With this arrangement it is also possible to represent vectors and matrices with negative elements whereby the results are obtained by taking the difference between two vector values.

The two detectors capture light beams whose polarization planes are normal to one another. Additionally it is possible through the use of a matrix-form light deflecting device which can be configured also as a hologram, to optionally space the detectors for the resultant matrix as far as possible from one another so as to minimize the diffraction effect. With the optional arrangement of the detectors, digital variants of the vector multiplier are possible.

BRIEF DESCRIPTION OF THE DRAWING

The above and other objects, features, and advantages will become more readily apparent from the following description, reference being made to the accompanying drawing in which.

SPECIFIC DESCRIPTION

Parallel light, preferably laser light traverses a modulator which is amplitude-modulated in columnar form. This is achieved, for example, by passing the light initially through a polarizer which polarizes the light in x' direction, whereby the x' direction is inclined 45° to the x direction, then through a transverse electro-optical modulator 11, 21 (FIGS. 1 and 2) constructed in a sandwich construction and generating a phase modulation of the light row-wise, and then again through a polarizer which stands normal to the x' direction, i.e. in the y' direction. According to this arrangement, one obtains light that is amplitude-modulated row-wise and is polarized in the y' direction.

Figure 1:
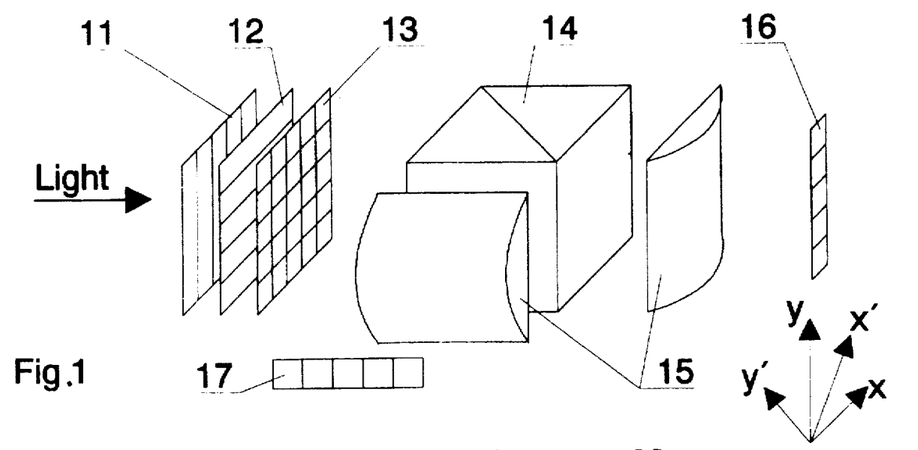
FIG. 1 is an exploded view which shows the basic structure of the optical computer unit.
Figure 2:
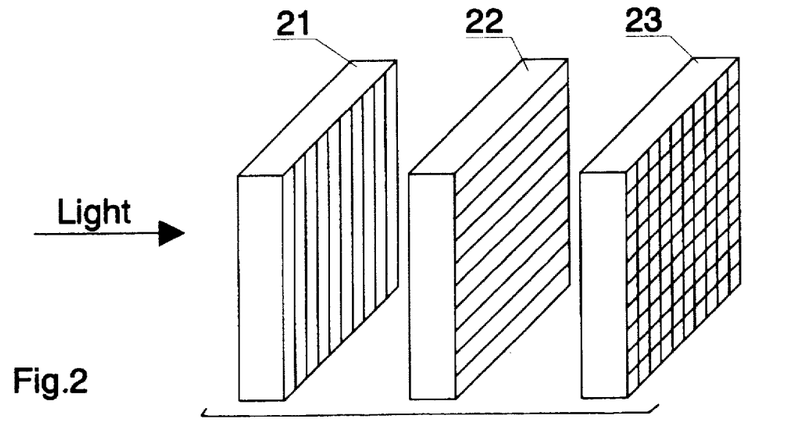
FIG. 2 is a perspective view of the basic arrangement of the light modulators.

In FIGS. 1 and 2 only the modulators 11, 12, 21, 22 without the polarizers have been schematically illustrated.

Downstream of the polarizer, a vector modulator (12, 22) is arranged which is rotated by 90° relative to the first modulator, together with a polarizer which is polarized in the x' direction. This is followed by a checkerboard modulator 13, 23 whose rows and columns are in agreement with the two vector modulators, and then a polarizer in the y' direction. If these matrix modulators operate with liquid crystals, the polarization planes of the latter polarizers and the polarization direction ahead of the matrix modulator must be correspondingly matched.

Downstream of the modulator arrangement, a beam divider 14 is provided whereby the both light beams are focused on two detector rows 16, 17 by two cylindrical lenses 15, the detector rows being perpendicular to one another with reference to the light path whereby the detector row 16 in the straight beam is directed either along the x or the y direction. With this arrangement vector matrix multiplication and also vector transposed matrix multiplication can be carried out. The vector modulators 11, 12, 21, 22 rotated through 90°, can additionally form the cross product or vector product of two vectors, the resultant being represented by a matrix-like modulated light beam, which can be determined with a vector matrix.

Figure 4:
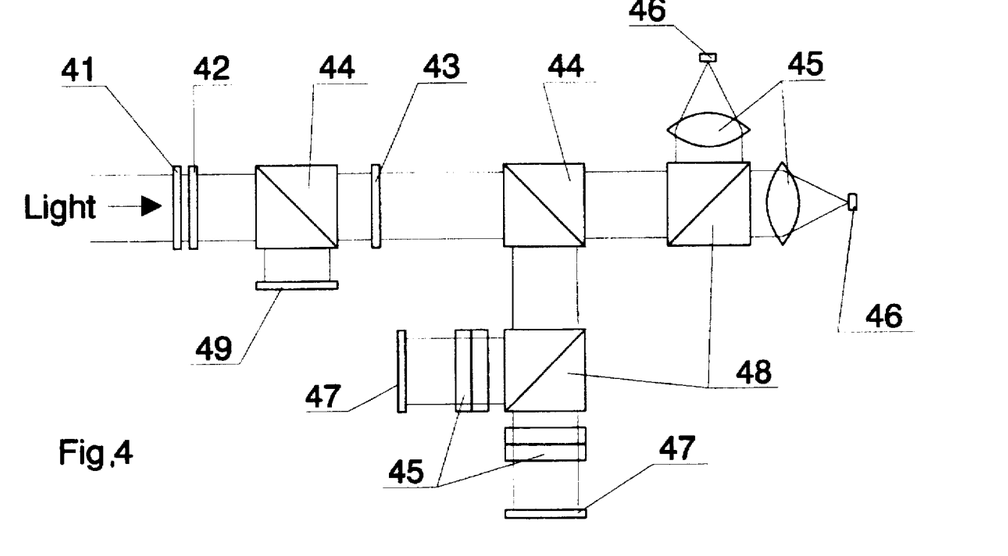
FIG. 4 is a diagram of a variant which can also operate with negative matrix elements.

In the arrangement illustrated in FIGS. 1 and 2, these detector matrices are found directly on the matrix modulator 13, 23 so that these arrangements have the advantage that the respective elements of the product matrix are precisely in the place at which a respective cell of the matrix modulator is found and the location of which is determined by a detector cell of the detector matrix so that the resultant can there be locally processed. In FIG. 4 the detector matrix is arranged at another location, whereby the radiation between the vector modulator and the matrix modulator is distributed.

The function of the optical computer unit is based upon a two-time local damping of the light beam, corresponding to an element-wise multiplication and a collection of light beams by cylindrical lenses, corresponding to a row-wise or column-wise addition. Depending upon whether a vector matrix multiplication or a vector transposition matrix multiplication is desired, one of the two vector modulators is made uniformly light transmissible and the other is controlled corresponding to the vector elements. The associated detector lens combination is normal to the controlled modulator stack with reference to the light path, i.e. the cylindrical axis of the lens and the detector row have the same direction in the light path as the individual rows of the associated modulator stack. With the aid of the other modulator stack, respective whole columns or rows of the matrix can be multiplied by a factor should this be required.

Figure 3:
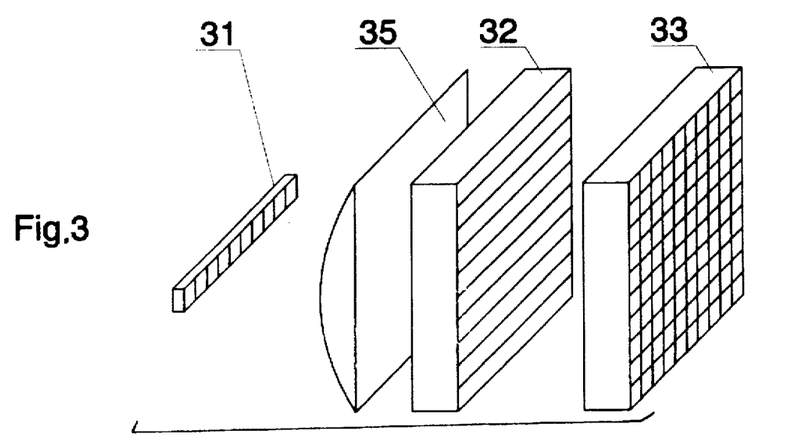
FIG. 3 is a view similar to FIG. 2 which illustrates a variant with a light source strip.

A further variant of the optical computing unit is schematically illustrated in FIG. 3. In this variant, the first vector modulator is replaced by a row of light sources 31, for example laser diodes and a cylinder lens 35, the vector elements are now described by the intensity of the individual light sources. In this arrangement one must take care that light beams from neighboring light sources do not fall into the light paths and thereby falsify the calculation. This can be achieved with an aid of small lenses which are located ahead of the light sources and guarantee that the light is only spread columnwise or row-wise. The lenses can have diaphragms.

In FIG. 3, the lenses and diaphragms are not shown. With the use of a polarized beam divider, the matrix elements can also be true to sign. The two beam components then contain light rays which, with respect to the light path, are polarized normal to one another. The beam components transit the identical lens detector arrangement 45, 46, 47, and the two resultant vectors are separated from one another. If the light beam leaves the matrix modulator 43 at 45° relative to the polarizing radiation divider, a zero is represented. Under 0° or 90°, there is an indication of one or minus one.

Figure 5:
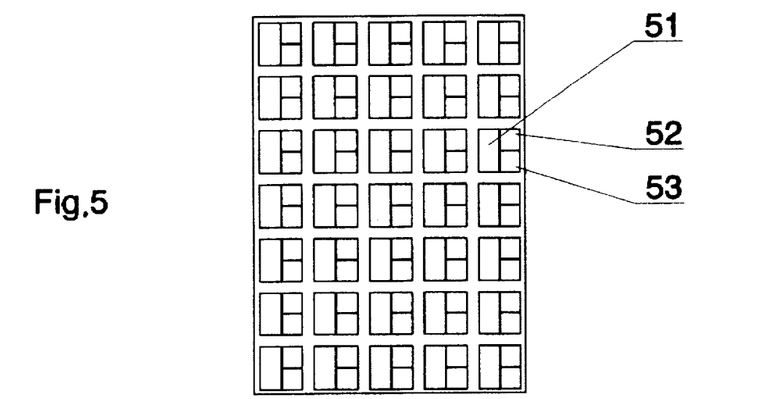
FIG. 5 is a plan view of a combination of a matrix modulator and a matrix detector.

FIG. 4 shows such an arrangement schematically. The two row modulators 41, 42 lie upstream in the light path followed by a radiation divider 44 which directs the light path partly through the matrix modulator 43 and partly onto the product matrix detector 49. Following the matrix modulator is another beam divider 44 which directs the light into two polarizing beam dividers 48 which then direct the light into the corresponding cylinder lenses 45 and row detectors 46, 47. There is additionally the possibility to use a combination of a modulator matrix and a detector matrix as is illustrated in FIG. 5, which enables a local evaluation of the cross product. Each cell in FIG. 5 contains a modulator 51 and two detectors 52, 53. Negative numbers in the vector, which are applied to the second modulator can be treated by a doubled configuration of the second modulator, whereby the absolute values of the positive and negative numbers are applied at two neighboring rows, or zeros for positive elements in the row for negative numbers and vice versa.

One of the detectors 52 is then used for the positive numbers and the other 53 for the negative numbers and the modulator cells 51 for both states. The corresponding detector rows 16 naturally also must be formed in duplicate and their measurement results correspondingly interpreted. Further, the positive and negative numbers can also be applied in a time-multiplexing process one after another. Another possibility is that ahead of the two detectors and the modulator cells, polarizers can be provided which allows a second vector with negative elements for the cross product. This method can, however, not be used for vector matrix multiplication. Additionally, electronic circuitry can be provided in the individual cells for carrying out logic and memory functions and the results of the learning process can be read out also in an optical manner.

Figure 6:
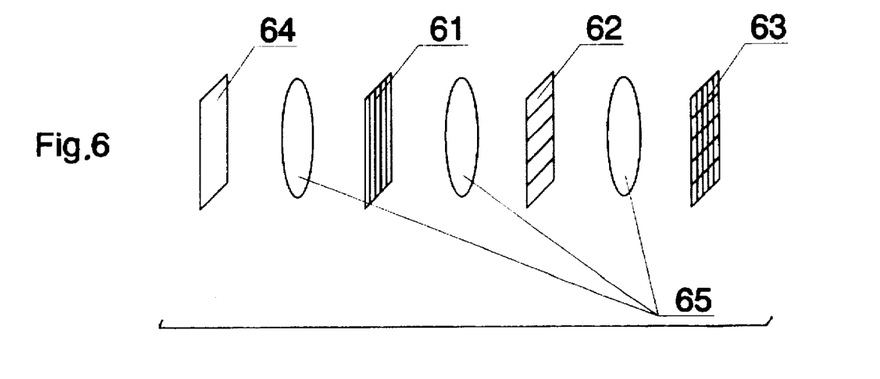
FIG. 6 is a diagram which illustrates a variant which operates with diffused light of a light source matrix or a binary phase grid.

A further variant (FIG. 6) which operates with diffuse light, makes use of a diode matrix 64 or with laser light and a binary phase grid which generates a matrix-form intensity distribution and in which the light is projected through lenses 65 in the respective next modulator 61, 62, 63, is also conceivable but then the matrix modulator 63 downstream of each cell must have a microlens and, selectively, diaphragms so that the light travels as a parallel ray so that it can be deflected in the detector row.

Figure 7:
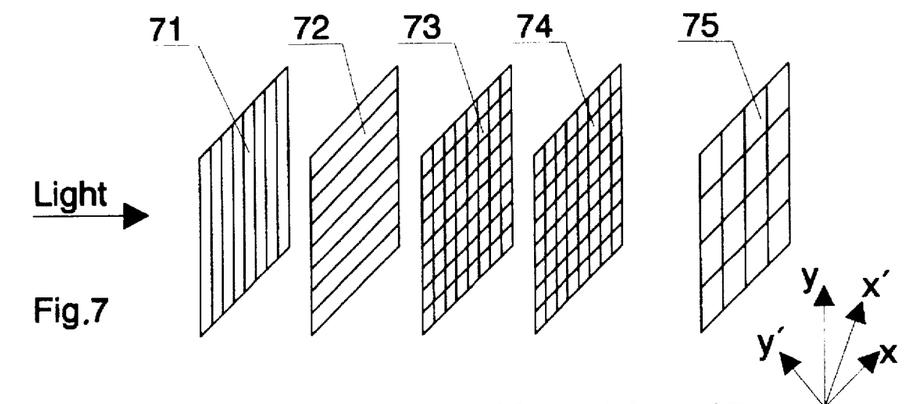
FIG. 7 is a similar diagram which illustrates the principal structure of the optical computer unit with a matrix-shaped light deflection device.

The optical computer unit illustrated in FIG. 7 operates like the optical computer unit in FIG. 1 (with the reference numerals in a series preceded by the digit "7") whereby the light detectors 75 are not arranged in a line but on a plane, for example, in a matrix form. Since these detectors are to be illuminated from light from a single row or a single column of the matrix modulator, instead of a cylinder lens a matrix from a light-deflecting device 74 must be used. Because of the two-dimensional arrangement of the detectors, their spacing must be increased substantially relative to the one-dimensional arrangement. When, for example, 100 detectors are to be arranged in a matrix form, there is an eleven times greater spacing of the detector center points when the side length of the matrix-form arrangement is equal to the length of the linear arrangement. In addition, the detectors can also be distributed three-dimensionally in that they can be applied on an arched surface or on pedestals to allow the light beams to impinge as perpendicularly run-on as possible. Because of the increase in the spacing, cross-talk to interpreting detectors by light diffraction effects is reduced.

The diffraction leads to the fact that the light points on the detectors have a finite expansion so that the spacing of the detector center points cannot be made optionally small. Because of the surface arrangement of the light points or the detectors, vectors with substantially more elements can be worked up and thus the efficiency of the computer unit correspondingly increased. Furthermore, this enables the formation of inter-mediate results in which a summation in one detector does not cover an entire row or column but rather only a portion thereof and the further processing is effected electronically.

Corresponding to the subdivision of the rows and columns, a greater number of detectors must be provided. The formation of intermediate results can be of advantage because as a consequence, with the digital variants, the sums which result need not be excessive so that they can be further worked up with precision. With the use of polarizers, with this variant as well, the matrix elements can be correct as to sign. The matrix-like light-deflecting device must then generate twice as many beam components. Then twice as many detectors are required and two resultant vectors are respectively obtained for the positive and negative components. The two resultant vectors are also here subtracted from one another.

The polarizers can be provided on the matrix-like light-deflecting device or also on the detectors. If they are provided on both, this has the advantage that there are no interactions between the light of the positive and of the negative numbers.

The matrix-like light-deflecting device has the purpose of deflecting each light beam which comes from the matrix modulator to the detectors 75, 85 (FIGS. 7 and 8) provided therefor, whereby it should be noted that both a light beam must impinge upon a detector for the result of the vector matrix multiplication and also a further light beam must impinge upon a detector for the result of vector-transposed matrix multiplication. This can be achieved in that each light beam is divided through a combination of a microbeam divider and a microprism and deflected to the two detectors.

Figure 8:
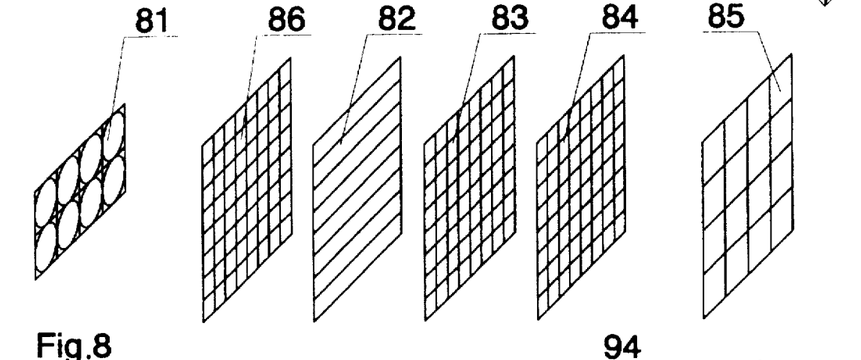
FIG. 8 is another diagram which illustrates a variant with a light source field.

It can also be achieved in that two microprisms can be arranged one beside the other in each light beam and each microprism can deflect half the light beam into the two detectors. Additionally a focusing through microlenses can be effected although this is not required, when the detectors or the diffraction light points are greater than the light beams themselves. Further, for this purpose one can use a field of holograms or a field of binary or multilevel phase grids. For holograms it should be noted that, depending on the arrangement, unwanted light beams result so that the detectors must be so arranged that these light beams are not disturbing.

With holograms, in addition, for each deflected beam, there is also a beam which is deflected with the opposite angle. Aside from this, a nondeflected beam is provided and deflection angles of higher order can arise. Binary or multilevel phase grids reduce the undesired light beams.

The variant shown in FIG. 8 functions like the variant of FIG. 3, whereby not only the detectors but also the light sources, for example, laser diodes, are oriented in a surface and whereby a three-dimensional arrangement on arched surfaces or on-pedestal is also possible. In this variant, the first vector modulator is replaced by a field of light sources 81, for example, laser diodes and a matrix-like light-deflecting device 86. The vector elements are here represented by the intensity of the individual light sources. Ahead of the light sources is to be found a lens field 82 which generates a strip-shaped light distribution on the subsequent matrix-like light-deflection device 83. From the latter, a parallel matrix-like bundle of light beams is sent out and these light beams are subjected to the same processing as the light in the variant of FIG. 7 after the first strip-shaped modulator, i.e. by the elements 83, 84 and 85 which correspond to the elements 73, 74 and 75 of FIG. 7.

Further, also here holograms can be used whereby instead of the strip-shaped pattern, also patterns of light points can abe generated. Thereby ahead of each light source, for example, a binary-phase grid with micro-optics can be generated which generates a line of light points on the matrix-like light-deflecting device in the corresponding column and which through the light sources can be modulated in their intensity.

A further variant, which operates with diffused light, with a diode matrix or with laser light and a binary-phase grid generating a matrix-like intensity distribution, is also conceivable in which the light is projected through the respective next modulator by lenses. However, the matrix modulator then must have after each cell a microlens and selectively diaphragms so that the light runs parallel and can be deflected in the detector row, whereby these microlenses can also be integrated in the matrix-like light-deflecting device or embodied as a hologram.

Figure 9:
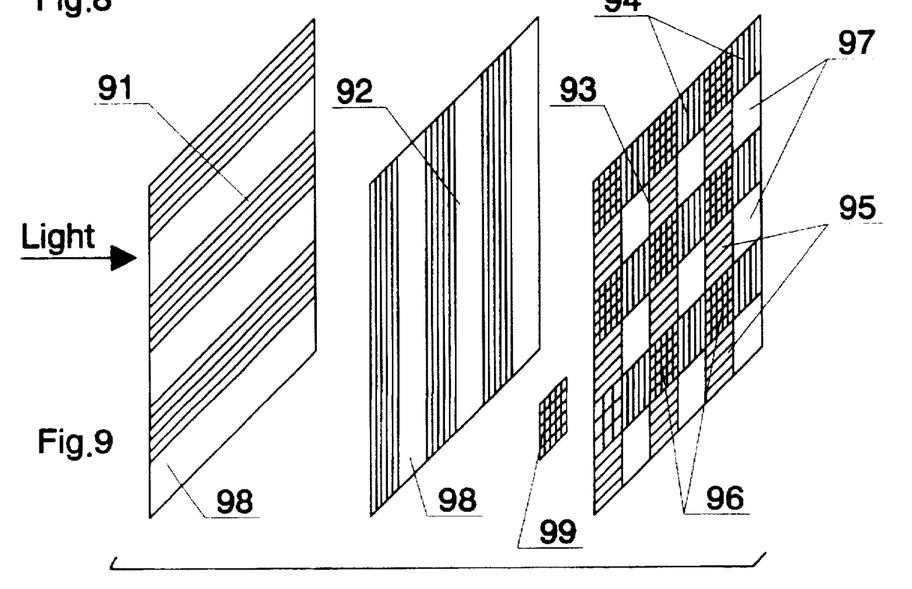
FIG. 9 is a diagram in the form of an exploded view of a variant which can operate with digital vector elements and matrix elements.

In FIG. 9 a digital variant of the optical vector multiplexer is shown whereby the matrix-like light-deflecting device is not imaged. The elements of the matrix-like light-modulator are comprised of small strip-shaped modulators for the elements of the matrix 94 and of the transposed matrix 95, of a field of detectors 96 for the result of the cross product and an optically unused region 97 which, for example, can be used for electronic circuitry. The strip-shaped modulators have narrow modulator strips 91 which represent the vector element and wide strips 98 which allow the light to pass unmodulated. These wide strips are each disposed in the light path ahead of the optically unused region of the matrix-like modulator.

The modulators in the binary variant switch the light out and in, whereby a binary multiplication with the aid of two modulators connected one behind the other, can be realized. If another number system is used, then the beam is modulated discretely in multiple stages. A digital number is displayed by a stack of modulators if two such stacks are arranged crossed one behind the other, there results a light beam matrix in which intermediate products of two digital numbers are contained and for which each requires shifting for addition to yield the final result of the multiplication of these two numbers. If, with the aid of the digital variant, the cross product or vector product is formed, the result is a matrix of matrix-shaped intermediate products which are collected with the detector field 96. The final result is formed by electronic processing. Further, the intermediate products can also be optically added, respectively shifted by one position, in that ahead of each detector field a matrix-form light-deflecting device (99) is provided.

In FIG. 9 for one element this construction has been illustrated. This feature reduces the number of detectors, whereby it should be noted that in the detectors numerical values arise which are greater than the digits of the digital numbers. In the same way, intermediate products are obtained behind the matrix-like modulator in the vector matrix multiplication and in the vector transposition matrix multiplication. These are added by a light deflection device in an optical manner whereby the individual matrices of the intermediate products are superimposed or the intermediate products can be added simultaneously in a digit by digit manner. With the next following electronic processing it must be taken into consideration that in detectors numerical values arise which are substantially greater than the digits of the digital numbers. Negative matrix numbers can be shown also here, as in the analog variants, by polarizers and doubled detector units. Negative vector elements can be shown through doubled units of the strip modulators or via a time-multiplex process.

Figure 10:
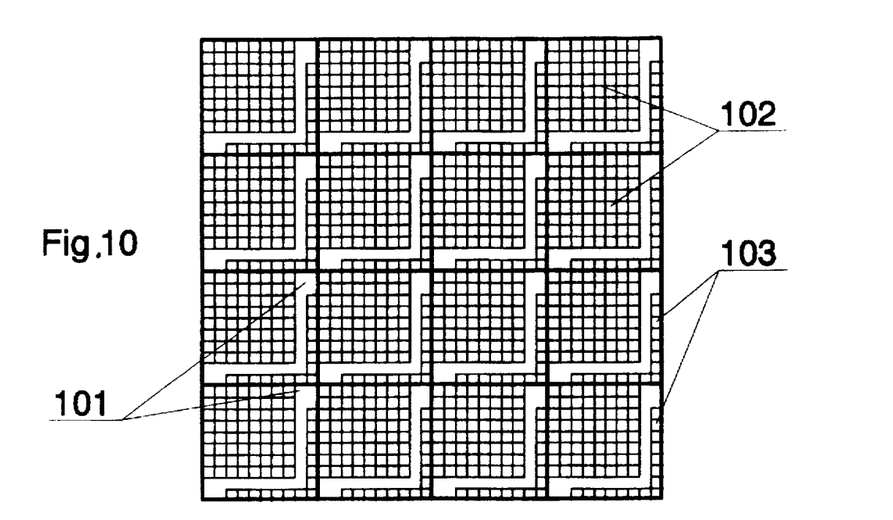
FIG. 10 is a plan view which illustrates a 4×4 matrix modulator with matrix-shaped modulator elements which can display the eight-position digital numbers.
Figure 11:
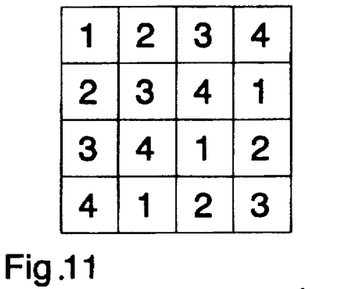
FIG. 11 is a plan view illustrates an element of a matrix-shaped modulator whereby this element is further constructed in a matrix-form from a plurality of modulator elements.

FIG. 10 illustrates a matrix-like modulator of a digital variant whereby the individual numbers are represented in the matrix-like modulator elements 101 as is represented equivalently in FIG. 11.

The numbers in the matrix of FIG. 11 are the positions of a four-position digital number. Each position is represented four times, the positions being uniformly diagonal in one direction and increase in the other direction toward the main diagonal and then begin again with the first position. With this representation, these modulator cells can be used both for vector matrix multiplication and for vector transposition matrix multiplication. A further processing is carried out as in the variant of FIG. 9, whereby the different arrangement of the positions of the intermediate product is to be noted.

For the formation of the cross product or vector product, also here a matrix-like light deflecting device can be found ahead of the modulator cells which deflects the light beams directly into the modulator cells 102 and with an inclination in the detectors 103 of the cross product. Thus a field of beam dividers or a hologram field can be used, whereby light paths of higher order, which run to neighboring cells can be interrupted by diaphragms. If in this embodiment the light is projected through lenses form one modulator to the other, then the light must be made parallel by a micro-lens field already ahead of the matrix-like light-deflecting device which is found ahead of the modulator cells. Aside from this, one can omit the matrix-like light-deflecting device ahead of the modulator cell and for each cell of the modulator element, provide a detector for the cross product whereby the further processing is effected electronically.

Figure 12:
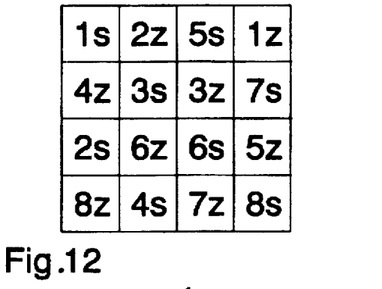
FIG. 12 is a diagram similar to FIG. 11 which illustrates a detector field showing for each detector the column or line from which light impinges.
Figure 13:
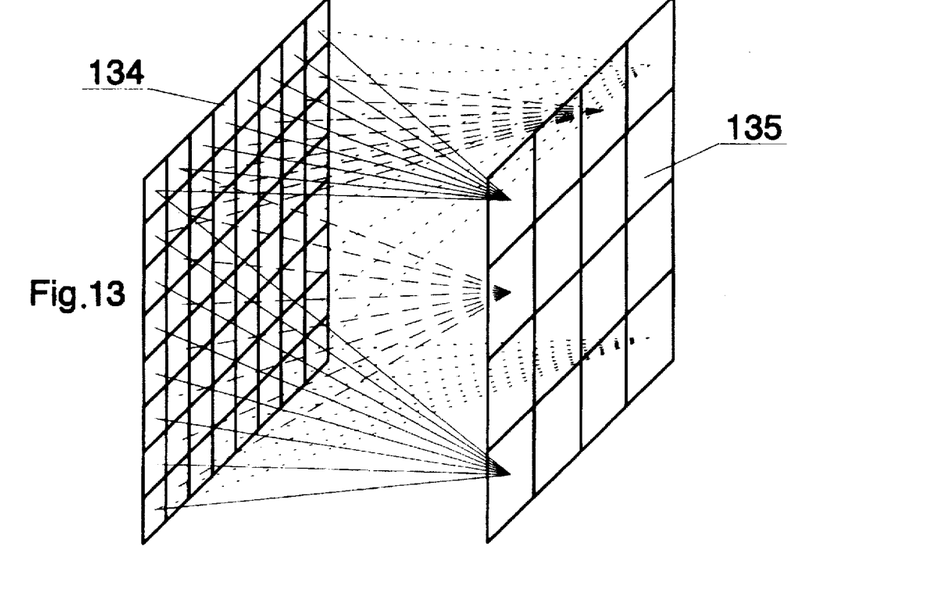
FIG. 13 is a perspective view from which one sees light paths from the matrix-like light deflection tubes to the detector field.

In FIG. 12 a detector field is illustrated whereby each detector has indicated thereon whether light impinges from a row (z) or a column (s) and the number of this row or column. In this example one can see that the numeration takes place from opposite sides in a chessboard pattern and increases from one side to the other in a row and column manner. With this arrangement signal paths are achieved which are of equal length as much as possible and a reduced angle of spread of light beams is obtained. In FIG. 13 several light paths form the matrix-like deflecting device 134 to the detector field 135 are indicated. If a hologram is used then undesired light beams can be detrimental in this configuration.

Figure 14:
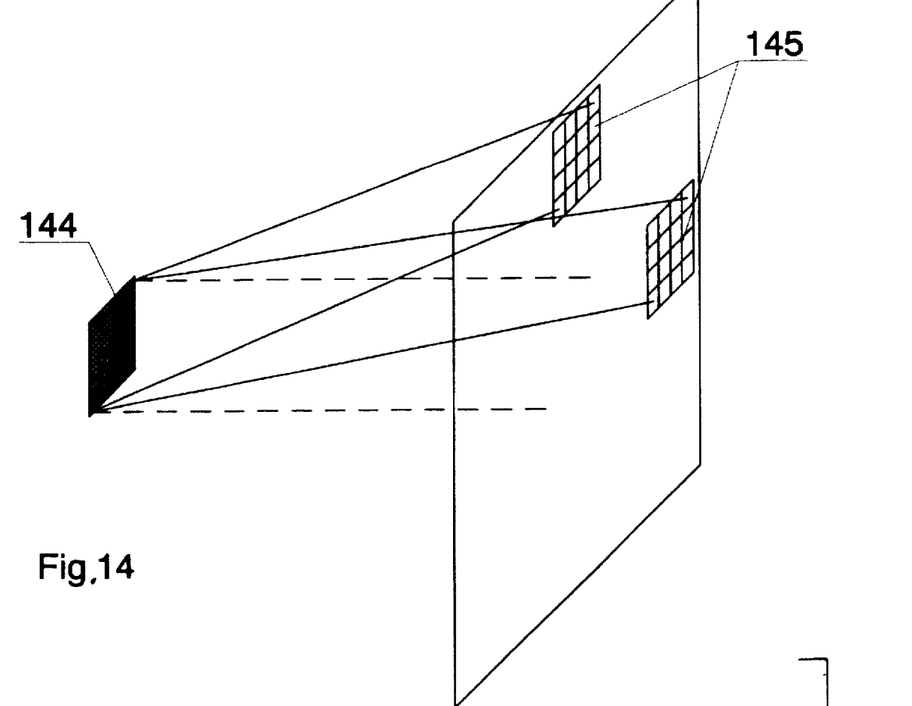
FIG. 14 is a diagram similar to that of FIG. 13 of a variant is shown which comprises holograms as a light-deflecting device.

FIG. 14 shows a variant in which the light deflecting device 144 is formed by a hologram, whereby the detector fields 145 are so arranged that undesired light beams do not impinge upon detectors. The desired light beams have been drawn in FIG. 14 and the undesired straight line light beams have been indicated by broken lines. There are still further undesired light beams that have not been illustrated to allow the drawing to be understood. So that additional undesired light beams which arise from the hologram do not impinge on detectors, the light beams must be deflected with large angles. So that the undesired light beams arise at a multiple of such large angles, the detector fields 145 can have appropriate places. In both detector fields, the detectors are arranged in a matrix pattern. The light from the left column of the light-deflecting device is deflected to the detectors on the left side of the column-detector field and the light from the right column of the light-deflecting device is deflected to the detectors on the right side of the column-detector field whereby for each column the light-deflecting device is provided with at least one detector and the detectors are illuminated successively from left to right by the columns of the light-deflecting device.

When one numbers the individual columns of the light-deflecting device from left to right, the respective detectors have numbers which advance in the detector column. For a reproduction of negative signs, the matrix can be provided, per column of the light-deflecting device, with two and in the case of a digital embodiment, also more detectors. For the rows of the light-deflecting device there is analogously something. The light of upper rows are deflected to upper detectors and each lower row to lower detectors of the row-detector field.

Figure 15:
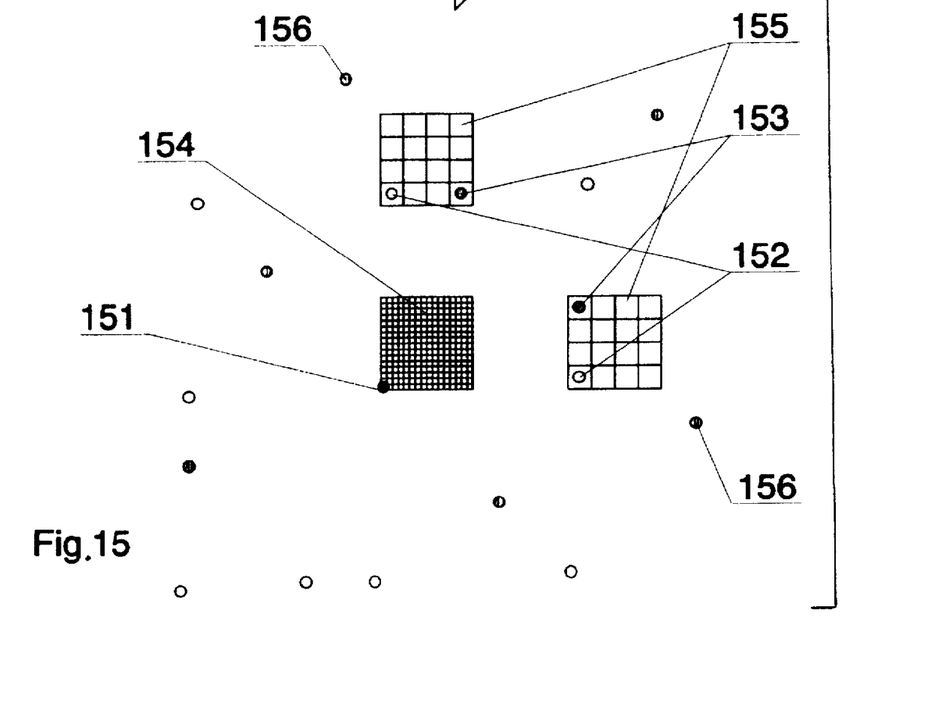
FIG. 15 is a plan diagram wherein the detector fields with several light points are illustrated.

In FIG. 15 the detector fields 155 are illustrated from the rear side out. The light-deflecting device has been represented to show the origin of the light beams. In the drawing the light points generated at the detector field are represented with circles. The light beams come from elements 151 of the light-deflecting device of the first column and the first row. The light point of the straight line light beam is illustrated with a solid circle while the remaining undesired light points are illustrated with thin circles. In FIG. 15, two possibilities of the detector illumination have been indicated. In the first, the detector rows begin the numeration (white circles 152) from the left or in the case of the detector columns from below, whereby in the second possibility the light points 156 come closer to the detector field. For reduction of undesired light points, binary or multi-layer phase grids can be used. Furthermore, one can use for vector matrix multiplication, vector transposed matrix multiplication and, when necessary determination of the sign of the matrix element, various hologram elements whereby each element generates only one desired light point and much fewer undesired light points arise. However, with these features, the area of the element is reduced, whereby diffraction effects are greater. The advantage of the variant in FIG. 14 is that the use of holograms enables better mass production.

The above described arrangements are suitable predominantly for calculations of neural networks. With these models, repeated vector matrix multiplication must be carried out whereby the matrix and its elements change only slowly. The use of rapid electro-optical vector modules can generate vectors rapidly and the matrix modulator can operate substantially more slowly. Especially effective results are obtained with the modulator-detector arrangement illustrated in FIG. 5 and a construction as in FIG. 4 but without the first beam divider. If one provides such arrangements one behind the other, one can achieve an optical computer for multi-layer neural networks. If the learning process is effected by the back-propagation algorithm, the data vector, which normally would contain only positive numbers, is applied to the first modulator and the difference vector which also contains negative values, to the second modulator.

Simultaneously the calculation is effected with the transposed matrix which is compelled by the model. Additionally, the cross product is necessary in the model and that also can be determined with the aid of this device. The result lies just where it is required, namely in the vicinity of the respective modulator cell. The nonlinearities of the model can be represented by so-called "Look-up" tables whereby even the nonlinear character of the modulators can be considered. Additionally, the vectors must be stored because they will be required later when the back-propagated difference vector is applied to form the cross product. So that the memory and administration costs are held as small as possible, a vector can be propagated forwardly and a vector propagated rearwardly in alternation. The changes of the matrix elements can be locally-stored and can be applied to the modulator cells simultaneously with or after passage by all vectors.

When cell liquid crystal modulators are used, one must figure on a certain time lag, especially when the changes are simultaneously applied. With changes after the passage of all vectors, one can wait for lapse of the time delay and only then start the next passage. The results of the learning process can be then read out. Because of the local processing, there is no great cost for wiring and the data can, for example, be inputted and outputted columnwise. As a result, this optical computer is suitable also for large networks with in excess of 1000 neurons for each completely net layer. If the application of a vector takes several nanoseconds, one can have calculating rates of several hundred tera operations per second. If the matrix modulator has a delay of several microseconds, about 1000 vectors per passage must be applied so that there will be no noticeable prolongation of the calculating rate. The optical computer is suitable also for other models of a neural network as, for example, the Perceptron, the Competitive Learning, the BAM and the Hopfield whereby both first modulators are suitable for normalization and selection functions of the rows and columns and the results from these functions are directly stored in the modulator detector matrix.

I claim:

1. An optical vector multiplier for calculations of linear algebra, comprising:
    two light modulators with strip shaped modulator cells representing a vector and rotated by 90° relative to one another
    a light modulator matrix following said light modulators along said path, said matrix comprising a matrix array of light detectors in a plurality of light detector fields and connected with electronic circuitry for processing signals from the detectors, the multiplier being traversed by parallel light and including optical devices causing the light to impinge upon at least one of said light detector fields, said modulator array including modulators for deflecting beams of the light so that resultant vectors of vector matrix multiplications are formed.

2. An optical vector multiplier for calculations of linear algebra, comprising
    a multiplicity of individually controllable light sources forming a light field representing a vector;
    optical devices for shaping said field to form a strip-shaped parallel intensity; a light modulator with strip-shaped modulator cells representing a vector, the light modulator being arranged in a path of the light from said sources rotated through 90° relative to the strip-shaped intensity distribution;

a light modulator matrix having modulator cells and a matrix arrays of light detectors in a plurality of light detector fields and connected with electronic circuitry which process signals from the detectors and control the modulator cells; and optical devices for deflecting light beams onto at least one of said light detector fields so that resultant vectors of vector matrix multiplications are formed.

3. An optical vector multiplier for calculations in linear algebra, comprising:

two light modulators with strip-shaped modulator cells representing a vector and rotated through 90° relative to one another in a light path a light modulator matrix downstream of said cells along said path and provided with an array of modulator cells and light detectors in a plurality of fields with electronic circuitry which process signals from the detectors and control the modulator cells of the arrows, said light modulators and said matrix being transluminated with light from a light source with a matrix shaped intensity distribution; and optical devices for directing the light on at least one of said light detector fields, whereby the light beams are so deflected that resultant detectors of vector matrix multiplications are formed.

4. The optical vector multiplier according to claim 1, claim 2 or claim 3 wherein at least one of said optical devices is configured as a matrix-like light-deflecting devices.

5. The optical vector multiplier according to claim 1, claim 2 or claim 3 further comprising a beam divider located ahead of the light modulator matrix which deflects the light onto a matrix-like light detector field.

6. The optical vector multiplier according to claim 1, claim 2 or claim 3 elements of said light modulator array are constructed from strip-shaped modulators representing individual numbers.

7. The optical vectifier multiplier defined in claim 1, claim 2 or claim 3 wherein said light modulators are optoelectric modulators in a sandwich construction and said light modulator matrix is a liquid crystalline modulator.

* * * * *